United States Patent Office 3,488,406
Patented Jan. 6, 1970

3,488,406
RESINOUS BLENDS AND METHOD OF MAKING
SAME
Eugene J. Sehm, 205 Storer Ave., Akron, Ohio 44302
No Drawing. Filed Oct. 5, 1967, Ser. No. 672,963
Int. Cl. C08g 29/50
U.S. Cl. 260—899                      9 Claims

ABSTRACT OF THE DISCLOSURE

Thermoplastic resinous blends are described which are especially useful in the production of articles useful at service temperatures of about 80° to about 110° C. and which comprise a blend of a post-chlorinated vinyl chloride base resin with smaller amounts of a finely particulate, rubbery yet essentially completely-gelled polymer of an alkyl acrylate in which the alkyl group contains from 2 to 8 carbon atoms. The particles of gelled polyacrylate are desirably predispersed in a matrix of a resinous processing aid such as polymethyl methacrylate. The blends are prepared by adding the rubbery, gelled polyacrylate to the base resin as tiny discrete ultimate particles ranging from about 500 to about 8000 Angstrom units (A.) in average diameter and the resulting mixture fluxed or fused under high shear at temperatures of from about 350° to about 480° F. Certain of the blends are especially useful in the form of injection molding compounds and others as extrusion and compression molding compounds. They may be used to produce pipe, tubing, injection molded fittings, extruded rod and sheet and other structural plastic forms for service at temperatures in the range of from about 80 C. to about 110° C.

RELATED APPLICATIONS

Some of the improved polyacrylate additives employed in the blends and method of this invention are the subject of a copending application in the name of Eugene J. Sehm and Elmer J. Dewitt, Ser. No. 672,982, of even date.

Blends of certain gelled polyacrylates with viny chloride resins are the subject of the copending sole application of Eugene J. Sehm, Ser. No. 673,055 of even date herewith.

BACKGROUND OF THE INVENTION

This invention relates to improved high temperature resins useful in structural applications such as pipe, tubing, fittings for joining pipe and tubing, sheets, etc. More particularly, the present invention relates to blends of post-chlorinated vinyl chloride resins (hereinafter referred to by the abbreviation "PCPVC") and, as an impact-improving and burst-strength improving additive, a rubbery, essentially completely gelled, finely-particulate polymer of an alkyl acrylate in which the alkyl group contains from 2 to 8 carbon atoms. The present invention is also directed to an improved method of making such blends. The term "high temperature" as used herein means a thermoplastic material having low creep at temperatures of 180° F. or above.

Post-chlorinated polyvinyl chloride (PCPVC) has found use as a rigid structural plastic capable of withstanding hot water at 180° to 212° F. or more. Household and industrial hot water piping of excellent quality has been made from blends of PCPVC and a small, controlled amount of a rubbery post-chlorinated polyethylene (hereinafter referred to by the abbreviation "PCPE") as an impact-improving additive or modifier.

PRIOR ART

Blends of PCPVC and PCPE are shown in U.S. Patent No. 3,299,182. Such blends can be formed by extrusion into pipe and tubing having excellent appearance and high burst strength, excellent resistance to distortion by heat, excellent chemical and solvent resistance and in addition, having a resistance to impact which is adequate for pipe and tubing extrusions prepared from fused or fluxed and then granulated or cubed material. Known forms of the PCPE modifier are expensive and difficult to produce and ordinarily are not easily prepared in a physical form adaptable to power blending techniques. The PCPVC/PCPE blends have been found to process by injection molding with some difficulty and the burst strength and impact strength of the injection molded articles is not as reliable as those of extruded or compression molded articles from the same or similar blends due to a slow-flow rheology, slow-knitting characteristics and a somewhat narrow processing latitude of the plastic in the injection molding machine.

Few of the known processing airs and impact-improving additives or modifiers used in rigid resins based on polyvinyl chloride (i.e. non-chlorinated) have been found useful in blends based on PCPVC. There is a need, therefore, for less expensive, more-easily produced additives or modifiers which (1) will modify the rheology of PCPVC to produce a quick-flow and quick-knitting behavior and widen processing latitude so as to permit wider application of PCPVC, as in injection molding, and produce injection molded finished articles of more reliably high burst strength and impact resistance, (2) improve the stability of the blend, and (3) can be incorporated in PCPVC more easily, preferably by powder blending techniques.

SUMMARY OF THE INVENTION

In accordance with the present invention, it has been discovered that a superior resinous formulation results when a PCPVC base resin is blended with a minor amount of a finely-particulate form of a rubbery yet essentially completely-gelled polymer of an alkyl acrylate (hereinafter referred to as "polyacrylate" or by the abbreviation "GPAC" for gelled polyacrylate) in which the alkyl group contains from 2 to 8 carbon atoms. The GPAC must be added in the form of very small ultimate particles having an average diameter in the range of from about 500 and about 8000 A. If desired, the particles of GPAC may be prepared as a macro-granular composite additive which the GPAC particles of the size indicated are uniformly dispersed in a hard, resinous matrix of a hard, non-tacky resinous material such as polyvinyl chloride, polymethyl methacrylate and the like. Such a granular material should be made up of granules between about 5 microns, more preferably about 50 microns, up to about 600 microns in diameter.

The blended resins must be subjected to a fusing or fluxing operation carried out under high shear and high temperatures in the range of from about 325° to about 480° F. in order for the blend to develop useful properties. Normally, the PCPVC and GPAC resins are of such sparing miscibility that fluxing of their solid, massive or other machogranular forms by known processing techniques is very difficult and dispersion of the rubbery GPAC in the hard, horny and high-softening PCPVC matrix is unpredictable and not subject to easy control. Non-gelled polymers of alkyl acrylates are unsatisfactory in PCPVC (1) due to adverse effects on the heat deformation (HDT) characteristics of the blend, (2) due to unreliable impact strength in the resulting blend, and (3) due to narrow or critical processing characteristics. The gelled, finely-particulate nature of the GPAC ingredient is believed to prevent break-down or a physical smearing-out of the rubbery GPAC modifier in the hard PCPVC base resin matrix. It has been observed that the blends of this invention retain their impact strength and burst strength much more tenaciously during extended high temperature processing than other known PCPVC formulations.

Also in accordance with this invention, it has been discovered that a lower molecular weight PCPVC prepared from a parent polyvinyl chloride of low to moderate molecular weight (inherent viscosity 0.55 to 0.85, ASTM D 1243) by chlorinating the latter to a moderately high density of 1.55 to 1.62 forms superior injection molding compounds when combined with a composite GPAC containing additive in which the particles of GPAC are dispersed in a matrix of polymethyl methacrylate. Such an injection molding compound has a rheology or melt-flow and hot knitting characteristics which permit the injection molding of complicated hollow shapes having reliably high burst strengths, for example, hollow fittings and connectors for plastic pipe and tubing such as tees, crosses, unions, valve bodies, caps and the like. Such fittings have uniformly high burst strengths approaching those of extruded pipe and tubing made by the extrusion of the blends prepared from higher molecular weight forms of PCPVC containing the PCPE type of modifier. These injection molding formulations are the preferred blends of this invention.

The injection molding operation requires a resin formulation which differs considerably in rheological characteristics from those formulations used in extrusion or compression molding. An injection molding formulation must have a quick-flowing and quick-knitting characteristic whereas the type of flow involved in extrusion can be much slower and the mixture is maintained under high pressure and high heat much longer than in injection molding so that knitting together of the plastic extrudate ordinarily is not a problem. The injection molding operation, although it involves a very short molding cycle, nevertheless subjects the resin to drastic shearing forces at temperatures often very considerably above normal processing temperatures due to the "wire-drawing" action to which a plastic material is subject in the sprues and nozzles of the injection molding apparatus. Thus, the injection molding operation imposes conflicting requirements of quick flow on the one hand and extremely high stability and ability to withstand high shear on the other. The most preferred blends of this invention meet these requirements much better than any prior known formulation.

POST-CHLORINATED VINYL CHLORIDE RESIN

Vinyl chloride resins which can be post-chlorinated to produce the base resin for the blends of this invention are produced by the polymerization of monomeric materials containing not less than about 95%/wt. of vinyl chloride and not more than about 5%/wt. of one or more other mono-vinylidene monomers (i.e. a monomer containing a single $CH_2=C<$ group per molecule) such as vinylidene chloride, vinyl acetate, methyl acrylate, styrene, acrylonitrile, methyl methacrylate, ethylene, propylene, and others. Polyvinyl chloride (i.e. the homopolymer) is greatly preferred. The vinyl chloride resin for use in post-chlorination should be inherently stable (stable on heating in air for at least 10 minutes at 375° F. in virgin state), it should be coarsely granular (i.e. made up of particles above 10 microns in diameter and up to 200 microns in diameter), it should be more or less porous by possessing about 5 to about 50% by volume of pore space or more, and have a moderate to high molecular weight (i.e. a specific viscosity at least as high as 0.40, more preferably at least about 0.45 and most preferably above 0.55).

Post-chlorination is preferably carried out by the method shown in U.S. Patent No. 2,996,489, namely, chlorination in aqueous suspension in the presence of (1) actinic radiation as an activator, in the presence of (2) a hydrochloromethane compound as a swelling agent such as monochloromethane, dichloromethane and trichloromethane (chloroform), in the prence of (3) an excess of dissolved chlorine, and (4) at a temperature not higher than 65° C. Chloroform is the preferred chloromethane compound since PCPVC material prepared in its presence are generally of greater stability than those made with other swelling agents.

The PCPVC material is defined or characterized both in terms of its own physical and chemical characteristics and in terms of the vinyl chloride parent resin. Thus, the PCPVC materials useful in the blends of this invention should have a specific gravity of 23° C., according to ASTM D 792, of from about 1.52 to about 1.62 (corresponding to chlorine contents ranging from about 63.5% to about 69%/wt.); a heat distortion or heat deformation temperature (HDT in ° C. by ASTM D 648) of from about 95° to about 125° C. (the range which is at least about 20° C. higher than the corresponding values for the parent vinyl chlorine resins); an Izod impact strength of at least 0.3 ft. lbs./inch at 264 p.s.i. (according to ASTM D 256); and a stability to heat in the virgin or unmodified condition as not to be visibly degraded when heated in air for 10 minutes at 375° F., or stated another way, at least as stable as was the parent vinyl chloride resin. Such PCPVC materials are produced by post-chlorinating high quality suspension-polymerized polyvinyl chloride resins which have a range of molecular weight evidenced by inherent viscosities, according to ASTM D 1243 using 0.2 gram of resin in 100 ml. of cyclohexanone at 30° C., ranging from about 0.55 to about 1.45.

PCPVS materials useful in blends suitable for injection molding having a specific gravity between about 1.55 and about 1.62 and is prepared by post-chlorinating a polyvinyl chloride having an inherent viscosity between about 0.55 and about 0.85. Such materials, as the above specific gravity values indicate, are chlorinated to a slightly greater extent than are the general purpose or extrusion grade PCPVC materials which have specific gravities in the range of from about 1.52 to about 1.55. Such higher degree of chlorination is necessary in order to impart the highest HDT values to the lower molecular vinyl chloride parent resin.

PREPARATION OF GELLED POLYACRYLATE (GPAC)

The GPAC ingredient of the blends of this invention is prepared by the polymerization in aqueous emulsion or aqueous dispersion of a monomeric material free of conjated unsaturation and containing (1) at least about 80%/wt. of one or more monomerica alkyl acrylates in which the alkyl group contains from 2 to 8 carbon atoms, (2) up to about 19.5% wt. of one or more mono-vinylidene monomers (i.e. a monomer containing a single vinylidene $CH_2=C<$ group per molecule) and readily copolymerizable with the alkyl acrylate, and (3) from about 0.5% to about 8%/wt., more preferably between about 1% to about 4%/wt., of a gel-inducing monomeric material free of conjugated unsaturation, which is copolymerizable with the alkyl acrylate, and which contains at least two nonconjugated vinylidene ($CH_2=C<$) groups per molecule.

Thus, the GPAC is prepared from one or more of ethyl acrylate, propyl acrylate, n-butyl acrylate, isobutyl acrylate, n-hexyl acrylate, n-heptyl acrylate, n-octyl acrylate, 2-ethylhexyl acrylate and others. Preferred alkyl acrylates are those in which the alkyl group contains from 2 to 4 carbon atoms, with n-butyl acrylate being most preferred. Methyl acrylate and acrylates in which the alkyl group contains more than 8 carbon atoms produce polymers of inferior properties in blends with PCPVC since the polyacrylate is deficient in one or more properties such as being insufficiently rubbery, deficient in stability, deficient in compatibility with PCPVC and/or low in impact-improving ability.

Suitable gel-inducing monomers for use in producing the essentially completely-gelled polyacrylate are divinyl benzene, divinyl ether, diallyl fumarate, diallyl phthalate, divinyl sulfone, divinyl carbitol, the monomeric acrylic polyesters of polyhydric alcohols and an acrylic acid selected from the class consisting of acrylic and methacrylic acids and containing at least two, and preferably from 2 to 6, acrylic ester groupings per polyester molecule, such as diethylene glycol diacrylate (hereinafter abbreviated "DEGDA"), diethylene glycol dimethacrylate, trimethylene glycol diacrylate, butylene glycol diacrylate, pentamethylene glycol diacrylate, glyceryl diacrylate, octylene glycol diacrylate, trimethylol propane triacrylate (hereinafter abbreviated "TMPTA"), trimethylol propane trimethacrylate, the tetraacrylate ester of pentaerythritol, and others, and the polyalkenyl polyethers of polyhydric alcohols in which the double bonds of the alkenyl ether groups are each present in the vinylidene $CH_2=C<$ group such as are produced by the Williamson synthesis in which a suitable alkenyl halide such as allyl bromide is reated with an alkaline solution of a polyhydric alcohol, especially 1,2,3-butane triol and the polyhydric alcohols derived from sugars and related carbohydrates such as sucrose, maltose, fructose, and the like, an illustrative monomer of this latter type being a polyallyl ether of sucrose containing 2, 3, 4 or more allyl ether groups per molecule, and others.

Much preferred as gel-inducing monomers are the acrylic polyesters of a polyalkylene glycol and of an acrylic acid selected from the class consisting of acrylic and methacrylic acids and containing from 2 to 6 acrylic or methacrylic ester groupings per polyester molecule. These esters copolymerize very smoothly with the alkyl acrylates and enter the copolymer chain in a uniform, random manner and at a frequency apparently determined largely by their concentration in the monomeric mixture. In the proportions recited, they seem to form no tightly-gelled or rigid three-dimensional networks which, if present, would not disperse and would show up as hard, resinous lumps or discontinuities in the final plastic article.

The gel-inducing monomer or monomers at levels of from about 0.5% to about 8%/wt. produce copolymers with the 2–8C alkyl acrylates which are essentially completely gelled, i.e. soluble to the extent of not more than 20%/wt. and preferably not more than about 10% in toluene at room temperature, as determined by an ultracentrifuge technique. In some of the examples below the solubility in tetrahydrofurane, a poorer solvent for polyacrylate is given. Optimum levels of the gel-inducing monomers, as determined by the impact strength and/or burst strength of the blended resins, lie in the range from about 1% to about 5%/wt., and most preferably in the range of from about 1% to about 4%/wt.

Although not preferred, in addition to the gel-inducing monomer or monomers, the monomeric mixture may also contain up to about 19.5%/wt. of one or more other monovinylidene monomers such as methyl acrylate and the alkyl acrylates in which the alkyl group contains more than 8 carbon atoms, vinyl chloride, vinylidene chloride, styrene, acrylonitrile, methyl methacrylate, acrylamide, vinyl acetate, ethylene, propylene, n-butene, n-hexene, n-octene, 2-ethylhexene-1, and other monoolefins, vinyl ethyl ether, chloroethyl vinyl ether, vinyl ethyl ketone, vinyl pyridene and many others.

The monomeric materials just described are polymerized in aqueous emulsion or dispersion to form a latex in which the latex particles average from about 500 to 8000 A., more preferably from about 1500 to about 8000 A., in average diameter. In this method, control of the emulsifier and catalyst levels, especially during the early portion of the reaction plus a controlled, continuous or portionwise addition of these and other polymerization adjuvants during the course of the reaction produce, in a known manner, latex particles of the larger size indicated and also a narrower range of latex particle size distribution. Such polymerization procedures are best carried out with water-soluble peroxygen-type and redox-type catalysts including potassium persulfate, persulfate/sulfite redox combination, azoisobutyronitrile, and others. Oil-soluble catalysts may be utilized such as 2,4-dicholobenzoyl peroxide, caprylyl peroxide, and many others. Buffers, chelating agents, reducing agents, synthetic dispersing and emulsifying agents, and most other polymerization adjuvants except mercaptans and other polymerization modifiers or gel-inhibitors may be employed where desired. Synthetic dispersants such as dodecyl benzene sulfonate, sodium lauryl sulfate, and others are preferred. Likewise, a fine particle size polyacrylate latex may be employed as a seed latex to which additional monomer is added to achieve particle size growth to the size desired. Polymerization may be carried out at any ordinary temperature in the range of from about 0° to 100° C. more preferably between about 25° C. and 70° C. It is usually desirable to strip unreacted monomer, if any from the latex. The resulting latex can be worked up to obtain a solid product useful in the blends of this invention by any technique which does not involve mechanical working of the rubbery material. It is desired to provide the rubbery GPAC in the form of a composite additive, as described below, in which the GPAC particles are dispersed in a matrix resin the latex is preferably utilized without further treatment except perhaps stripping of residual monomers and the addition of short-stopping and/or stabilizing agents. Work-up of the GPAC latex, per se, can be effected by coagulating, freezing, spray drying and the like to produce a crumb-like product. The latter, when not subjected to malaxation or other form of mechanical working, is a loose agglomerate of the original GPAC latex particles which when added to the base resin and the mixture worked, as on a two-roll plastics mill, breaks down and the GPAC is well dispersed as latex particles in the resulting mechanically-worked blend.

Before-and-after electron microscope photographs taken on a GPAC material and again on a fully processed resinous blend containing it confirm that the resinous blend contains the GPAC particles in an essentially unchanged, uniform, finely-particulate type of dispersion in the matrix resin. The tough, rubbery character of the gelled polyacrylate particles prevents breakdown of the polyacrylate and solution thereof in the matrix resin and/or smearing-out of the rubbery particles during high shear processing at high temperatures. For this reason, the blend is believed more tenaciously to retain its high impact strength and have wide processing latitude. This same toughness and physical and chemical integrity prevents softening of the matrix resin and loss of its HDT properties. The preferred injection molding type compounds of this invention are believed to derive their resistance to breakdown during injection molding, in large measure, from the toughness and lack of breakdown of the GPAC material.

COMPOSITE ADDITIVES

It is much preferred to predisperse the GPAC particles in a matrix of a hard, non-tacky thermoplastic resin in order to obtain a finely-particulate or powdery composite product which can either be powder blended with the PCPVC base resin and/or other compounding ingredients to provide directly a powdered or granular premix which can be fluxed and fused as such or fed to an extrusion machine, to an injection molding machine and to other processing operations where fluxing and fusing occurs during the final forming action. In particular it is desirable to disperse the GPAC particles in a resinous, thermoplastic coating which is a processing aid and which will improve the rheology of the resulting composite material. Preferred matrix materials are polyvinyl chloride, vinyl chloride/propylene copolymers containing from 0.5% to 10%/wt., more preferably from about 1% to about 7%/wt. of combined propylene, vinyl chloride/n-butene copolymers, polymethyl methacrylate, styrene/acrylonitrile copolymers, styrene/methyl methacrylate, copolymers, vinyl fluoride homopolymer and copolymers, and others. Most preferred for use in the preferred injection molding formulations is a composite additive having a polymethyl methacrylate matrix deposited by in situ polymerization.

The in situ polymerization of the matrix resin is carried out by adding the monomer or monomers for the matrix resin to the GPAC latex and carrying out a normal polymerization in aqueous medium under agitation. In some cases, it may be necessary to add additional quantities of dispersing or emulsifying agent and/or catalyst to produce, as a final product, a latex which upon coagulation, precipitating or spray-drying produces a macrogranular product each granule of which consists of a continuous matrix of a hard, thermoplastic resin in which are uniformly dispersed the tiny particles of GPAC. The resulting latex of composite material must be treated to remove the water without destroying the particulate identity of the latex particles and this may be effected by ordinary coagulation, as by addition of a coagulant such as alcohol, by freezing, by spray drying and the like to produce a finely particulate product.

A much preferred procedure, which procedure is the subject of my copending application Ser. No. 672,982, of even date herewith, involves a suspension polymerization technique wherein either a GPAC latex or a slurry of crumbs resulting from coagulation of a GPAC latex, monomers for the desired matrix material, a colloidally-active suspension agent (as distinguished from an agent having dispersing or emulsifying action) such as gelatin, methyl cellulose, polyvinyl alcohol, bentonite clay and the like, and an oil- or monomer-soluble catalyst sparingly soluble in water are combined and agitated until the latex phase (or crumbs) disappear and polymerization of the added monomers proceeds with the production of a slurry or suspension of solid particles. Such a product is dust-free and composed of very uniform particles having a narrow particle size distribution, the individual particles of which consist of a hard, resinous matrix in which are dispersed most uniformly the tiny GPAC latex particles. Such a product is worked up simply by filtering the slurry followed, if desired, by a water wash of the filter cake and drying. Such a product is preferentially air dried, vacuum dried or spray dried to minimize agglomeration of the particles. Drying should be without mechanical working of the material and is effected at moderate temperatures of 0° to 100° C., more preferably from about 15° to about 75° C.

BLEND COMPOSITION

In general, it is preferred to add to the PCPVC a minimum of additives such as processing aids and impact-improvers, diluents, fillers, colorants, stabilizers and other compounding ingredients consistent with processing requirements in order to avoid loss of end product properties. PCPVC materials have markedly lower tolerance for such added compounding ingredients than does polyvinyl chloride, for example, Thus, the proportion of GPAC should be kept as low as possible while obtaining on the one hand, the desired impact and burst strengths and the desired ease of processing on the other. At levels between about 3 and about 5 parts by weight of GPAC (exclusive of any matrix resin material) per 100 parts by weight of PCPVC (phr.) base resin the impact resistance shows a modest increase to a value of about 0.5 ft. lbs./in. of notch and processing characteristics are improved to acceptable levels for extrusion or compression molding but not for injection molding. Between about 5 phr. and about 10 phr. of GPAC the impact strength rises to the range of 2 to 5 ft. lbs./in. or more and high and reliable burst strengths are developed in articles produced by extrusion, compression molding or injection molding, surface finish is very good and the heat distortion characteristics of the blend are as good as or better than those of the virgin PCPVC base resin. More importantly, however, at the 5-10 phr. level, the chemical resistance, solvent resistance and electrical properties of the blend remain at acceptable levels. In the range above about 15 phr. of GPAC the chemical resistance and tensile strength of the blend begin to decline and these properties may be marginal for general purpose applications. Impact strength and burst strength do not appreciably improve above the 10 phr. level making the preferred range of composition from 4 to 5 phr. on the low end and up to 10 phr. on the high end.

As indicated, the proportions given immediately above are expressed as 100% GPAC material exclusive of any matrix resin material. When the GPAC additive is employed in the form of a composite granule, it is noted that the main effect of most of the matrix materials is that of a diluent material as far as impact strength of the blend is concerned and do not operate to reduce the amount of GPAC material required. Also, most of the processing aid types of matrix resins adversely affect the HDT characteristics and the chemical and solvent resistance of the PCPVC base resin. Since the main beneficial effects of the matrix material are (1) to provide an easily used granular material, (2) preserve the particulate identity of the GPAC, and (3) improve processing and the "knitting" quality of the blend, the proportion of the matrix material in the blends should be minimized at levels where these objectives are achieved. The minimum proportion of the matrix material needed for reducing tack in the GPAC is in the range of 10 to 15%/wt. based on the weight of the composite GPAC material. While greater proportions may be employed, if desired or if permitted by end-use application, the composite GPAC material should not contain more than about 45%/wt., more preferably not more than 35%/wt., of matrix resin lest too much of the latter be carried into the blend when providing sufficient to the rubbery GPAC component. Stated another way, at least about 1 to 2 phr. of the matrix resin (based on the weight of PCPVC base resin) are required for noticeable improvement of processing. Preferably between about 2 phr. and 4 phr. of the matrix resin are usually required. This means that the preferred weight of matrix resin in the composite additive is between about 15% and about 35%/wt.

BLEND PREPARATION

To develop optimum end-use properties in the blend, mechanical working of the blend is required. Such end-use properties are not developed to the fullest extent in the absence of shear (i.e. such properties are not fully developed by a mere sintering operation). While the mechanism is not understood, it is believed that mechanical working at high temperatures under considerable shearing forces is required to induce at least a small amount of adhesion between the hard and horny PCPVC matrix and the rubbery GPAC material which normally are of low miscibility. It is difficult to define the quantum of work required to be expended on the blend in order to develop its optimum end-use properties. However, very satisfactory mixing and fusion of the stock occurs on a #4 two-roll plastics mill with close-set rolls and having 120 p.s.i. steam pressure (172° C.; 341.6° F.) on the interior of the rolls. Stock temperatures will ordinarily be somewhat higher than the surface temperature of the mixing equipment due to friction. For example, when the blend is prepared as described above on a mill, the stock temperatures will be at 400 to 425° F. and when prepared by pre-mixing in a Banbury with a measured drop temperature of about 350° F., stock temperatures measured with a needle pyrometer will often be of the order of 420° F. Stock temperatures in an injection molding machine may reach as high as 480° F. It has been observed that the blends of this invention are equivalent in processing to those of U.S. Patent 3,299,182 in that they may be processed in from about 3 to 10 minutes of milling using mill roll temperatures of 300 to 400° F. which correspond roughly with stock temperatures of from about 325° to about 440° F.

BLEND TESTING

Except where otherwise noted, the blends of this invention are prepared by mill mixing by a procedure wherein the blend is placed on the rolls and mixed until a sheet adhering to the front roll is obtained. Mill mixing time is measured from the latter point in time. The mixed and fluxed blend is tested by preparing a standard ASTM tensile sheet by preheating the milled sheet for 3–5 min. at a temperature 5 to 10° F. above its milling temperature and then molding for 3 minutes under 30,000 lbs./ pressure in the tensile sheet mold at the specified temperature. The Izod impact strength and tensile strength are then determined on the molded sheet material according to ASTM D 256 (Method A) and ASTM D 638–61T (2′/min. at 77° F. The heat distortion temperature (HDT, ° C.) is determined according to ASTM D 648 at 264 p.s.i. In some cases additional tests are performed on the blend, as follows:

Physical property: ASTM
  Flexural strength, 73° F. (p.s.i.) _____ D790
  Flexural modules, 73° F. (p.s.i.) _____ D790
  Repeated flexural stress (fatigue) p.s.i. _____ D671
  Elongation at break, percent _____ D638
  Water absorption, 24 hours at 73° F. (percent gain) _____ D570
  Specific gravity (at 23° C.) _____ D792

The invention will now be described with greater particularity with reference to certain specific examples which are intended as being illustrative only.

EXAMPLE I

Preparation of gelled polybutyl acrylate latex

The following materials are utilized:

Material: Parts/wt. Parts/vol.
  Water _____ lbs__ 58.75
  $K_2S_2O_8$ _____ gms__ 12.72
  $K_2S_2O_5$ (5% sq. sol.) _____ gms__ 6.36
  $NA_2S_2O_4$ _____ gms__ 0.5
  N-butyl acrylate _____ lbs__ 35.0
  DEGDA [1] _____ lbs__ 0.7
  Emulsifier [2] (10% aq. sol.) _____ gms__ 158.9

[1] Diethylene glycol diacrylate.
[2] "Siponate DS10," an emulsifier made by Alcolac Chemical Corporation and said to be a purified form of dodecyl benzene sodium sulfonate.

The water and 10 ml. of the emulsifier solution are combined in a sealed, stirrer-equipped reaction vessel and the air therein displaced by nitrogen while the contents are heated briefly with agitation to about 80° C. At this point the $K_2S_2O_5$ is added and stirring continued after which the catalyst ingredients are added. The two monomers are pre-mixed and the addition of the resulting mixture to the reactor is commenced in a portionwise manner to maintain the reaction temperature at 38–40° C. (starting with an initial addition of 1.7 lbs. of the mixture). After vigorous evolution of heat is noted, a 58 ml. portion of the emulsifier solution is injected into the reaction vessel. The monomers and emulsifier solutions are subsequently metered into the reactor at a ratio of about 45 ml. of the emulsifier solution for about every 1 lb. of monomers added. Total reaction time is 10 hours by which time monomer addition has been terminated and a falling reactor temperature indicates that most of the monomers have polymerized. At the latter point, the reactor and its contents are heated briefly to about 60° C. after which the reactor is vented. The reactor then is observed to contain a stable latex which is filtered through a #700 filter cloth. The total solids content of the filtered latex is about 35.6%/wt. and its pH about 5.35. The average latex particle size is determined to be about 2660 A., as determined by a soap titration technique. This latex is designated hereinafter as "Latex A."

A portion of Latex A is coagulated with methanol and the resulting rubbery coagulum dried to a constant weight in a vacuum drier at about 50° C. A weighed sample of the dried coagulum is placed in a sealed container with a measured quantity of toluene or tetrahydrofurane (THF) and the container and its contents placed on paint mixing rolls overnight at room temperature. The next day, an aliquot portion of the contents of the container are ultracentrifuged at 30,000 r.p.m. to obtain a small quantity of a gel-free liquid. The total dissolved solids content of the latter liquid are determined by evaporating the sample to constant weight and the total solubility of the original dry, rubbery coagulum arrived at by back-calculation. The coagulum is found to be essentially completely gelled since its solubility in THF, normally one of the best solvents for polyalkyl acrylates, is only about 6.1%/wt. The solubility procedure just described is a special procedure since the usual sol-gel extraction procedure is not applicable to such highly-gelled materials which are composed almost entirely of microgel particles.

Preparation of composite additive

The following materials are employed:

Material: Parts/vol. Parts/wt.
  "Latex A" _____ lbs__ 75
  Water _____ lbs__ 32
  Emulsifier [1] (10% sq. sol.) _____ grams__ 430
  $K_2S_2O_8$ _____ do____ 6
  $K_2S_2O_5$ (in 50 ml. water) _____ do____ 1.5
  Methyl methacrylate _____ lbs__ 7.5
  $NA_2S_2O_4$ _____ grams__ 2

[1] Same as above.

The reaction is carried out in a sealed vessel equipped with a 100 r.p.m. stirrer. The latex is charged to the vessel, the vessel closed, and then purged with pure nitrogen while heating briefly to 60° C. to expel as much oxygen as possible. The free space in the vessel is then evacuated and again pressured to 25 p.s.i. with nitrogen and cooled to 35° C. With the agitator in operation, the full amount of the methyl methacrylate is added followed by injection of the $NA_2S_2O_4$ solution. After mixing for 15 minutes, the $K_2S_2O_8$ solution is injected and mixing continued for another 15 minutes. At the latter point, the $K_2S_2O_5$ solution is injected and agitation continued for a total of four hours while taking periodic samples. The latter reveal that essentially all the methyl methacrylate has polymerized in one hour at 35° C. The reactor is vented and the latex therein filtered through a #700 filter cloth. No solid material is noted on the cloth. A total of 115.2 lbs. of latex are obtained which analyzes as containing 30.13%/wt. of dispersed solids and has an average latex particle size of 3120 A. 316 grams of the latex is poured into 900 ml. of methanol and the resulting granular coagulum is dried to a constant weight of 95 grams ("Product A"). The dried material is soluble in THF to the extent of 5.3%/wt. The weight of polymethyl methacrylate matrix is about 23%/wt.

A second portion of Latex A is treated in a similar fashion to produce a product having 31.4%/wt. of polymethyl methacrylate matrix. The latter product is designated herein as "Product B." The latter material exhibits a solubility in THF of 11.9%, with the increase in solubility over that of the original gelled polybutyl acrylate being derived from the matrix resin material.

By similar procedures, a "Latex C" of a gelled polybutyl acrylate (only 6.1%/wt. soluble in THF; 1.2% in toluene) having a particle size of about 4628 A. is prepared from a mixture of 97 parts/wt. of n-butyl acrylate and 3 parts/wt. of DEGDA. Also by similar techniques approximately 30% wt. of methyl methacrylate is in situ polymerized in the presence of the particles of Latex C to produce a final latex containing about 30.1%/wt. total solids. The average particle size (diameter) of the composite latex particles is over 5000 A. Portions of such latex are coagulated in methanol by a procedure similar to that above and the resulting fine, granular coagulum dried to produce ("Product C") a dry granular composite product exhibiting a solubility of only 11.9%/wt. in THF.

PREPARATION OF BLENDS

Products A, B and C are each employed in a number of blends with PCVC where the only variable is the proportion of the modifier employed. The PCPVC utilized in these blends is a commercially-available material known as "Geon 606 X 560" which is characterized by a specific gravity of 1.56 (a chlorine content of 65.7%/wt.) and is produced by the post-chlorination of an easy-processing grade of polyvinyl chloride having an inherent viscosity of about 0.74 according to ASTM D-1243-65T (using 0.2 gram of resin in 100 ml. of cyclohexanone at 30° C.), with chlorination being carried out by the procedure similar to that of U.S. Patent No. 2,996,489. The blends are pre-mixed in a Banbury mixer to a dump temperature of 350° F. (stock temperature ca. 405° F.) and the premixed stock milled on a #4 two-roll plastics mill operating with mill rolls maintained at about 342° F. In all cases, the blends exhiibted good milling behavior with the formation of a good rolling bank and a sheet adherent to the front mill roll. A portion of the milled stock is employed in the production of tensile test sheets on which are determined tensile strength, Izod impact strength, HDT and water absorption by the ASTM procedures listed above. The remainder of the milled stock is sheeted off and allowed to cool before being charged to an Ankerwerk Model V25-200 injection molding machine equipped with a mold to produce a standard 2-inch T pipe fitting. The machine is operated with the following temperature profile:

|   | ° F. |
|---|---|
| (1) Nozzle temperature | 330–350 |
| (2) Cylinder temperatures: | |
|     End Cap | 380–400 |
|     Barrel | 370–395 |
|     Screw entrance zone | 350–370 |
|     Hopper zone | 300–330 |
| (3) Mold temperature | 210–220 |

Under these conditions, the stock temperatures vary between about 430° and about 480° F.

The resulting T fittings are pressure tested to failure to determine their burst strength. A fairly large number of T fittings made with each blend are so tested to obtain an indication of reliability in the burst strengths. The data are as given below wherein the proportions given in parentheses are the content of rubbery, gelled polyacrylate material exclusive of the weight of polymethyl methacrylate matrix material:

| Blend No. | 1* | 2 | 3 | 4 | 5 | 6 |
|---|---|---|---|---|---|---|
| Ingredients, parts/wt.: | | | | | | |
| PCPVC | 100 | 100 | 100 | 100 | 100 | 100 |
| Dibutyl tin thioglycollate (stabilizer) | 2.5 | 2.5 | 2.5 | 2.5 | 2.5 | 2.5 |
| Low molecular weight polyethylene | 1.0 | 1.0 | 1.0 | 1.0 | 1.0 | 1.0 |
| TiO$_2$ pigment | 5.0 | 5.0 | 5.0 | 5.0 | 5.0 | 5.0 |
| Post-chlorinated polyethylene** | 8.75 | | | | | |
| Product A [1] | | 11.4 (8.77) | 7.8 (6.0) | | | |
| Product B [2] | | | | 12.5 (8.75) | 8.57 (6.0) | |
| Product C [3] | | | | | | 12.5 (8.75) |
| Milling—stock temp., ° F | 395 | 410 | 405 | 395 | 400 | 400 |
| Test properties: | | | | | | |
| Ave. T burst strength, p.s.i | 1,114 | 1,597 | 1,623 | 1,599 | 1,647 | 1,552 |
| No. T's tested | 12 | 11 | 12 | 11 | 12 | 16 |
| Burst uniformity, relative order | 5 | 3 | 2 | 4 | 1 | 1 |
| Tensile strength, p.s.i | 8,600 | 7,950 | 8,300 | 7,750 | 8,250 | 7,500 |
| Izod impact, ft.-lbs./inch | 0.75 | 2.9 | 1.7 | 2.0 | 1.4 | 2.30 |
| HDT, ° C | 99 | 101 | 102 | 102 | 102 | [4]103 |
| Water absorption, 72 hrs. at 212° F., percent/wt. change | 1.26 | ([5]) | ([5]) | ([5]) | ([5]) | +0.89 |

* Control.
** See Example II below.
[1] Ca. 23%/wt. polymethyl methylate—2% DEGDA.
[2] Ca. 30%/wt. polymethyl methylate—2% DEGDA.
[3] Ca. 30%/wt. polymethyl methylate—3% DEGDA.
[4] Test sheet prepared from stock milled 7 minutes, all other 4 minutes.
[5] Not determined.

The above data shows a surprisingly uniform and considerably higher burst strength for the PCPVC/GPAC blends than for the control formulation. To better illustrate this point, there are tabulated below the burst strength on all T's made in the above experiment from blends 1, 3 and 5 of the preceding table.

| | Burst Strength, p.s.i. | | |
|---|---|---|---|
| Blend No. | 1* | 3 | 5 |
| T No.: | | | |
| 1 | 520 | 1,510 | 1,670 |
| 2 | 1,710 | 1,650 | 1,640 |
| 3 | 390 | 1,690 | 1,600 |
| 4 | 1,490 | 1,630 | 1,690 |
| 5 | 1,657 | 1,635 | 1,675 |
| 6 | 400 | 1,625 | 1,620 |
| 7 | 335 | 1,640 | 1,645 |
| 8 | 1,700 | 1,600 | 1,675 |
| 9 | 375 | 1,575 | 1,680 |
| 10 | 1,655 | 1,600 | 1,620 |
| 11 | 1,575 | 1,640 | 1,600 |
| 12 | 1,550 | 1,550 | 1,650 |

*Control.

Note also that the blends of this invention have somewhat better HDT values, and Izod impact strengths from 2 to 3 times better than those of the control. Blend No. 6 is also evaluated for its water absorption and found to increase in weight only 0.81% on immersion for 24 hours at 212° C. as compared to a corresponding value of 1.26% for the control (blend 1; by ASTM D 570). These data show the blends of this invention to produce injection molded pipe fittings as reliable in burst strengths as is extruded pipe produced from higher molecular weight extrusion grade formulations based on PCPVC/PCPE blends.

EXAMPLE II

In this example, several crumb-style samples of GPAC materials are employed in blends with a PCPVC base resin. One such GPAC ("modifier A") is an essentially completely gelled polyethyl acrylate produced from a latex (av. particle size about 2000 A.) produced by a procedure similar to that above from a monomeric mixture of 98 parts/wt. of ethyl acrylate and 2 parts/wt. of diethylene glycol diacrylate, such GPAC material having a solubility of only 2.4%/wt. in THF and is employed in the form of a rubbery, crumb-like material. A second such GPAC material ("modifier B") is a crumb-form of an essentially completely gelled polybutyl acrylate prepared by similar techniques from a mixture of 97 parts/wt. of diethylene glycol diacrylate (solubility in THF about 2%; average latex particle size 2114 A.). The compositions indicated below are prepared by pre-mixing in a Banbury to a stock temperature of 370° followed by milling on a #4 two-roll plastics mill for 7 minutes with final stock temperatures of 400–500° C. Portions of each milled sheet are subjected to physical testing and the remainder is extruded as pipe in a 1½-inch NRM extruder operating at 30 r.p.m. (stock temp. 395–405° F.). A control blend of PCPVC/PCPE is also extruded.

The PCPVC base resin is a high molecular weight extrusion grade material having a specific gravity of 1.54 which is produced by post-chlorinating (by methods indicated herein) an easy-processing grade (porous) of a high molecular weight polyvinyl chloride having an inherent viscosity of 1.12. The data are as follows:

| Blend No. | 1* | 2 | 3 |
|---|---|---|---|
| Material, parts/wt.: | | | |
| PCPVC | 100 | 100 | 100 |
| Stabilizer [1] | 3 | 3 | 3 |
| Calcium stearate | 2 | 2 | 2 |
| TiO$_2$ pigment | 5 | 5 | 5 |
| PCPE [2] | 7 | | |
| Modifier A | | 10 | |
| Modifier B | | | 10 |
| Extrusion: | | | |
| Rate | 45 | 39.5 | 51.25 |
| Wt. | 163 | 132 | 178 |
| Swell factor | 3.62 | 3.34 | 3.48 |
| Vice crush | Good | Good | Good |
| Tensile-yield (p.s.i.) | 7,900 | 7,200 | 6,350 |
| Izod impact (7 min.[3]), in.-lb./in. | 1.8 | 1.8 | 1.5 |
| HDT, °C.: | | | |
| 2 min.[3] | 109 | 109 | 109 |
| 4 min.[3] | 107.5 | 110.5 | 110 |
| 7 min.[3] | 109.5 | 112 | 111.5 |

*Control.
[1] Dibutyl tin thioglycollate.
[2] Post-chlorinated polyethylene, about 33% by weight chlorine, produced by chlorinating a polyethylene of density about 0.95.
[3] Milling time of sample tested.

The above data indicate that the rubbery, gelled polyacrylate, without added resinous processing aids, facilitates the extrusion of the otherwise quite difficult to process PCPVC material and these results are obtained without loss of HDT or impact strength. The HDT values of the blends seem to improve slightly on samples milled for the longer periods. The latter observation is taken as clear evidence of the stability of the GPAC material under long-continued processing under high shear at high temperatures.

is employed in an emulsion-suspension style of in situ polymerization carried out employing the following materials.

Over-polymerization recipe

| Material: | | Parts/wt. Parts/vol. |
|---|---|---|
| Water | ml | 830 |
| Methocel H.G.65 (1%) [1] | ml | 100 |
| K$_3$PO$_4$ | gram | 0.15 |
| Latex (37% total solids) | do | 270 |
| IPP Catalyst (10% sol. in CH$_3$OH) [2] | ml | 2 |
| Vinyl chloride | grams | 106 |
| Propylene | do | 18.8 |

[1] Methyl cellulose, 1%/wt. mucilage.
[2] Diisopropyl peroxy dicarbonate.

The water and methyl cellulose are added to a stirrer-equipped (500 r.p.m.) sealed reaction vessel and the oxygen content displaced by a nitrogen atmosphere. The remaining ingredients are then added, the stirrer started and cooling applied to hold the temperature to about 40° C. After a few hours, an additional 140 grams of vinyl chloride are injected and the reaction continued for a total of about 24 hours. It is noted that the reaction mixture is initially milky in appearance due to the latex but as reaction proceeds the latex phase disappears and a suspension of a pearl-type of resin forms which requires only filtering, washing and drying to produce a final product of remarkably uniform, macro-granular particles (i.e. 100–600 microns in diameter) of the "pearl type" having a dilute solution viscosity of 0.783 (0.353 gram in 100 ml. of cyclohexanone at 30° C.) and in which the matrix resin is a copolymer which constitutes about 60.6%/wt. of the final dried product and contains about 3.8%/wt. of combined propylene. In one blend (E), a separate vinyl chloride/propylene copolymer is added, this material being similar in nature to that of the matrix resin.

Blends of the PCPVC and the above product are prepared by milling for 5 minutes after band formation on a 4-inch two-roll plastics mill having its rolls maintained at 385° F. The resulting blends are preheated in an ASTM standard tensile sheet mold for 5 minutes at 400° F. and then 30,000 p.s.i. pressure applied and the mold cooled under full pressure. The data are as follows:

| Blend No. | A | B | C | D | E | F | G* |
|---|---|---|---|---|---|---|---|
| Material, parts/wt.: | | | | | | | |
| PCPVC | 75 | 75 | 75 | 75 | 75 | 75 | 75 |
| Product of this example | 7.2 | 9.0 | 10.8 | 14.4 | 18.75 | 14.4 | 0 |
| Parts GPAC/ | 5.15 | 6.24 | 7.49 | 9.98 | 13.0 | 9.98 | |
| Parts VCl/Prop/100 phr | 4.47 | 4.76 | 6.91 | 9.22 | 12.0 | 16.0 | 0 |
| VCl/Prop.Cop | 0 | 0 | 0 | 0 | 0 | 5.1 | 0 |
| Stabilizer [1] | 0.75 | 0.75 | 0.75 | 0.75 | 0.75 | 0.75 | 0.75 |
| TiO$^2$ | 3.75 | 3.75 | 3.75 | 3.75 | 3.75 | 3.75 | 3.75 |
| Properties: | | | | | | | |
| Izod, in.-lbs./in | 0.6 | 1.3 | 1.4 | 1.9 | 9.1 | 1.8 | 0.3 |
| HDT, °C | 100.0 | 101.5 | 98.0 | 92.0 | 98.5 | 98.0 | 100.5 |
| Melt flow (g./10 min.) | 6.3 | 3.5 | 5.1 | 5.9 | 5.7 | 6.2 | 4.2 |
| Appearance of molded sheet | ([2]) | ([2]) | ([2]) | ([2]) | ([2]) | ([2]) | ([3]) |

*Control.
[1] Same as previous sample.
[2] Smooth, slightly glossy.
[3] Slightly rough.

EXAMPLE III

In this example, a PCPVC base resin is employed having a density of 1.56 and produced by post-chlorinating an easy-processing porous grade of polyvinyl chloride having an inherent viscosity of 0.65. The GPAC material employed in the blends of this example is a gelled polybutyl acrylate dispersed in in situ polymerized vinyl chloride/propylene copolymer. The polybutyl acrylate is prepared in latex foam having a particle size of about 2550 A. and about 1.8%/wt. solubility in THF. The resulting latex containing about 37%/wt. total solids The above data indicate that the processing characteristics (see melt flow values and surface gloss) of the PCPVC base resin (in contrast see Control "G") are improved by the vinyl chloride/propylene gelled polybutyl acrylate composite modifier. Note that concurrently with the improved processibility, the impact values are very considerably improved and that the effect on HDT is quite mild, in fact, Blends "A" and "B" show a quite acceptable balance of properties for an extrusion formulation at the 5–6 parts/wt. level of the rubbery portion of the composite modifier.

What is claimed is:

1. A resinous product comprising an intimate mixture of (a) 100 parts by weight of post-chlorinated vinyl chloride resin containing at least 95% wt. of vinyl chloride characterized by having a specific gravity of between about 1.52 to 1.62 and a chlorine content of from about 63.5% to 69%/wt., a heat distortion temperature, according to ASTM D 648–56, within the range of 95° C. to 125° C., and high heat stability; and (b) from about 3 to about 15 parts by weight of a rubbery, finely-particulate essentially completely gelled polymer of an alkyl acrylate containing at least about 80%/wt. of alkyl acrylate in which the alkyl group contains from 2 to 8 carbon atoms, which polymer is soluble in toluene at room temperature to the extent of less than 20%/wt. and is present in said mixture in the form of fine particles ranging from about 500 to about 8000 A. in average diameter.

2. A product as defined in claim 1 and further characterized in that said post-chlorinated vinyl chloride resin is a post-chlorinated polyvinyl chloride and said finely particulate alkyl acrylate polymer is present in said mixture in the form of granules containing said fine particles uniformly dispersed in a matrix of a hard, non-tacky thermoplastic resinous processing aid constituting from about 10% to about 45% by weight of the total weight of said granules.

3. A product as defined in claim 1 and further characterized by said post-chlorinated vinyl chloride resin being a post-chlorinated polyvinyl chloride, said finely particulate alkyl acrylate polymer is present in the said mixture in the form of granules containing said fine particles dispersed in a matrix of polymethyl methacrylate, and said polymethyl methacrylate constitutes from about 10% to about 45%/wt. of the total weight of said granules.

4. A product as defined in claim 1 and further characterized by said post-chlorinated vinyl chloride resin being a post-chlorinated polyvinyl chloride, by said finely-particulate polymer or an alkyl acrylate being present in such mixture as latex-derived particles obtained by the polymerization in aqueous emulsion of a monomeric material free of conjugated unsaturation and containing at least 80%/wt. of at least one of said alkyl acrylates, not more than about 19.5%/wt. of a mono-vinylidene copolymerizable with said alkyl acrylates, and from about 0.5% to about 8%/wt. of a gel-inducing comonomer copolymerizable with said alkyl acrylates and which contains at least two non-conjugated vinylidene groups per molecule.

5. A product as defined in claim 1 and further characterized by said post-chlorinated vinyl chloride resin being a post-chlorinated polyvinyl chloride and said polymer of and alkyl acrylate being a polymer produced by the polymerization in aqueous emulsion of a monomeric material consisting of an alkyl acrylate in which the alkyl group contains from 2 to 4 carbon atoms and from about 1% to about 4%/wt. of an acrylic polyester of a polyalkylene glycol and acrylic acid containing from 2 to 6 acrylate ester groupings per molecule of said polyester, said polymer having a solubility at room temperature in toluene of less than 10%/wt.

6. A granular resinous injection molding composition comprising as polymeric ingredients (a) 100 parts by weight of a post-chlorinated polyvinyl chloride produced by the post-chlorination of a polyvinyl chloride parent resin having an intrinsic viscosity, according to ASTM D 1243, between about 0.55 and about 0.85, said post-chlorinated polyvinyl chloride having a specific gravity, according to ASTM D 792, between about 1.55 and about 1.62, a heat distortion temperature, according to ASTM D 648–56, of at least 95° C. and a heat stability at least equal to that of the said polyvinyl chloride parent resin; and (b) from about 5 to about 10 parts by weight of a tough, rubbery material present in the form of granules composed of fine particles of a rubbery, essentially completely gelled material having an average diameter between about 1500 and about 8000 A. dispersed uniformly in a hard, non-tacky resinous matrix of polymerized methyl methacrylate, said fine particles being produced by the polymerization in aqueous dispersion of a monomeric material consisting of an alkyl acrylate in which the alkyl group contains from 2 to 4 carbon atoms and from about 1% to about 4%/wt. of a monomeric acrylic polyester of a polyalkylene glycol and acrylic acid, said ester containing from 2 to 6 acrylate ester groupings per molecule of said polyester, the material of said fine particles having a solubility at room temperature in toluene of less than about 10% by weight, and said granules being composed of from about 65 to about 85% by weight of said rubbery material and from about 15% to about 35% by weight of said polymethyl methacrylate matrix.

7. A composition as claimed in claim 6 and further characterized by said alkyl acrylate being n-butyl acrylate.

8. A composition as claimed in claim 6 and further characterized by said alkyl acrylate being ethyl acrylate.

9. A composition as claimed in claim 6 and further characterized by (1) said alkyl acrylate being n-butyl acrylate and by (2) a fused, fully-fluxed condition having an Izod impact strength according to ASTM D 256 of at least 0.5 ft. lbs./in. by reason of having been fused under high shear at temperatures in the range of about 350° to about 480° F.

References Cited

UNITED STATES PATENTS

| | | | |
|---|---|---|---|
| 3,373,229 | 3/1968 | Philpot | 260—899 |
| 3,345,434 | 10/1967 | Griffith | 260—901 |

MURRAY TILLMAN, Primary Examiner

C. J. SECCURD, Assistant Examiner

U.S. Cl. X.R.

260—876, 878, 885, 897

UNITED STATES PATENT OFFICE
CERTIFICATE OF CORRECTION

Patent No. 3,488,406                          January 6, 1970

Eugene J. Sehm

It is certified that error appears in the above identified patent and that said Letters Patent are hereby corrected as shown below:

In the heading to the printed specification, line 4, "Eugene J. Sehm, 205 Storer Ave., Akron, Ohio 44302" should read -- Eugene J. Sehm, Akron, Ohio, assignor to The B. F. Goodrich Company, New Yrok, N. Y., a corporation of New York --. Column 1, line 33, "80C" should read -- 80° C. --; line 42, "viny" should read -- vinyl --. Column 2, line 16, "power" should read -- powder --; line 25, "airs" should read -- aids --; line 66, "machogranular" should read -- macrogranular --. Column 4, line 14, "prence" should read -- presence --; line 44, "PCPVS" should read -- PCPVC --; lines 62 and 63, "conjated" should read -- conjugated --; line 64, "monomerica" should read -- monomeric --. Column 5, lines 25 to 26, after "glyceryl diacrylate" insert -- glyceryl triacrylate --; line 34, "reated" should read -- reacted --. Column 6, line 18, "dicholo-" should read -- dichloro --. Column 8, line 52, "sufficient to" should read -- sufficient of --. Column 11, line 31, "PCVC" should read -- PCPVC --; line 46, "exhiibted" should read -- exhibited --. Column 12, line 23, chart column 6, "$^4$103" should read -- $103^4$ --; line 43, chart column 1, "1,657" should read -- 1,675 --. Column 13, line 2, after "Wt.of" insert -- n-butyl acrylate and 3 parts/wt.of --; line 6, "400-500° C." should read -- 400-405° C. --; Column 15, line 38, "polymer or an alkyl" should read -- polymer of an alkyl --; line 52, "of and alkyl" should read -- of an alkyl --.

Signed and sealed this 13th day of October 1970.

(SEAL)
Attest:

EDWARD M. FLETCHER, JR.                    WILLIAM E. SCHUYLER, JR.
Attesting Officer                             Commissioner of Patents